(12) United States Patent
Hsiao

(10) Patent No.: US 8,009,242 B2
(45) Date of Patent: Aug. 30, 2011

(54) BACKLIGHT MODULE AND LIQUID CRYSTAL DISPLAY UTILIZING SAME

(75) Inventor: Chih-Chung Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 373 days.

(21) Appl. No.: 12/217,328

(22) Filed: Jul. 3, 2008

(65) Prior Publication Data

US 2009/0009684 A1    Jan. 8, 2009

(30) Foreign Application Priority Data

Jul. 4, 2007    (CN) .................. 2007 2 0121292 U

(51) Int. Cl.
*G02F 1/1333* (2006.01)
*G02F 1/1335* (2006.01)
*G09F 13/04* (2006.01)
*F21V 15/00* (2006.01)

(52) U.S. Cl. ............ 349/58; 349/65; 362/97.2; 362/362
(58) Field of Classification Search ................... 349/58, 349/65; 362/362, 97.2
See application file for complete search history.

(56) References Cited

U.S. PATENT DOCUMENTS

| 6,722,773 | B2 | 4/2004 | Tsai et al. | |
| 2007/0091639 | A1* | 4/2007 | Yoo | .............................. 362/612 |

* cited by examiner

*Primary Examiner* — Mark Robinson
*Assistant Examiner* — Jerry Blevins
(74) *Attorney, Agent, or Firm* — Altis Law Group, Inc.

(57) ABSTRACT

An exemplary backlight module includes a back plate, a side bar received in the back plate, and an optical film assembly received in the back plate. The side bar includes a main body and an elastic member extending from the main body. The elastic member and the main body cooperatively define a receiving groove therebetween. The optical film assembly is received in the back plate, and has an edge portion elastically received in the receiving groove. A liquid crystal display employing the backlight module is also provided.

15 Claims, 5 Drawing Sheets

BACKLIGHT MODULE AND LIQUID CRYSTAL DISPLAY UTILIZING SAME

FIELD OF THE INVENTION

The present invention relates to backlight modules, and more specifically to a backlight module with detachable optical film, and a liquid crystal display (LCD) utilizing the backlight module.

GENERAL BACKGROUND

Liquid crystal displays providing light weight, thin profile, and low power consumption have become widely used in office, video, and other applications.

Referring to FIG. 5, a typical liquid crystal display 7 includes a bezel 71, a liquid crystal panel 72, and a direct backlight module 73 arranged in that order. The backlight module 73 includes a plastic frame 74, an optical film assembly 75, a plurality of linear light tubes 76, and a back plate 77 arranged in that order. The backlight module 73 further includes two linear side bars 78 arranged at two opposite sides of the back plate 77. Each side bar 78 defines a linear groove 782 therein for receiving an edge of the optical film assembly 75. The groove 782 is defined along an orientation of the side bar 78, and is perpendicular to the light tubes 76.

When the liquid crystal display 7 is assembled, the bezel 71 and the back plate 77 cooperatively accommodate the liquid crystal panel 72, the plastic frame 74, the optical film assembly 75, the light tubes 76, and the side bars 78. Referring also to FIG. 6, the edges of the optical film assembly 75 are received in the grooves 782 of the side bars 78.

To achieve stable optical performance of the backlight module 73, the optical film assembly 75 is generally tightly received in the groove 782. However, the requirement of tightness may result in inconvenience in assembly of the edge of the optical film assembly 75 into the groove 782 of the side bar 78, and possible scraping damage to the edge of the optical film assembly 75 when the optical film assembly 75 is assembled to or detached from the side bar 78.

What is needed, therefore, is a backlight module that can overcome the described limitations.

SUMMARY

In an exemplary embodiment, a backlight module includes a back plate, a side bar received in the back plate, and an optical film assembly received in the back plate. The side bar includes a main body, and an elastic member extending therefrom. The elastic member and the main body cooperatively define a receiving groove therebetween. The optical film assembly is received in the back plate, and has an edge portion elastically received in the receiving groove. A liquid crystal display employing the backlight module is also provided.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe various embodiments of the present invention in detail.

Figure 1:
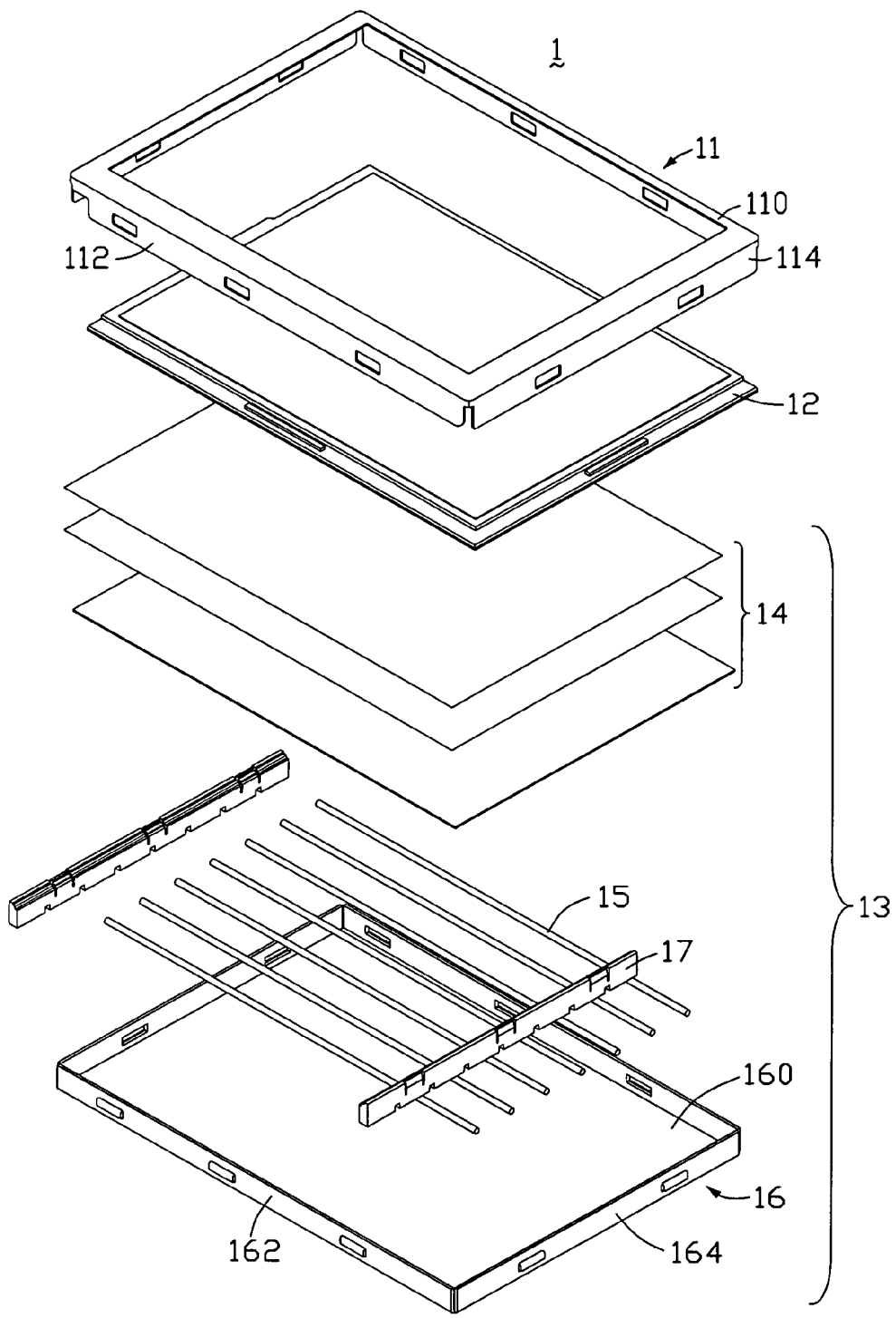
FIG. 1 is an exploded, isometric view of a liquid crystal display according to an exemplary embodiment of the present invention, the liquid crystal display including a pair of side bars and an optical film assembly.

Referring to FIG. 1, a liquid crystal display 1 according to an exemplary embodiment of the present invention is shown. The liquid crystal display 1 includes a bezel 11, a liquid crystal panel 12, and a direct backlight module 13 arranged in that order. The backlight module 13 includes an optical film assembly 14, a plurality of linear tubes 15, and a back plate 16 arranged in that order. The backlight module 13 further includes a pair of side bars 17 configured to be received in two opposite sides of the back plate 16.

The bezel 11 includes a front plate 110, two opposite first side plates 112, and two opposite second side plates 114. The front plate 110 is substantially a rectangular frame, which defines a central cutout (not labeled) corresponding to the liquid crystal panel 12. The first side plates 112 extend from two opposite long sides of the front plate 110, and the second side plates 114 extend from two opposite short sides of the front plate 110, respectively. Each of the first side plates 112 and the second side plates 114 includes a plurality of notches (not labeled) defined therein. The bezel 11 can, for example, be steel, iron, aluminum, magnesium, or any suitable alloy that includes at least one of these metals.

The optical film assembly 14 includes a plurality of stacked optical films (not labeled). In the illustrated embodiment, the optical film assembly 14 includes a first brightness enhancement film (BEF, not labeled), a second BEF (not labeled), and a diffusing film (not labeled) arranged in that order. In an alternative embodiment, the optical film assembly 14 may include a single optical film.

The light tubes 15 are linear illuminators, and can for example be cold cathode fluorescent lamps (CCFL) or hot cathode fluorescent lamps (HCFL). The light tubes 15 are configured to provide illumination of the liquid crystal display 1. In alternative embodiments, the light tubes 15 can be U-shaped, S-shaped, or other desired configuration.

The back plate 16 includes a rectangular second wall 160, two first side walls 162, and two second side walls 164. The first side walls 162 extend from two opposite long sides of the second wall 160, and the second side walls 164 extend from two opposite short sides of the second wall 160. Each of the first side walls 162 and the second side walls 164 includes a plurality of protrusions (not labeled) outwardly extending from outer surfaces (not labeled) thereof. The protrusions of the first side walls 162 respectively correspond to the notches of the first side plates 112, and the protrusions of the second side walls 164 respectively correspond to the notches of the second side plates 114. The back plate 16 can, for example, be steel, iron, aluminum, magnesium, or any suitable alloy that includes at least one of these metals.

Figure 2:
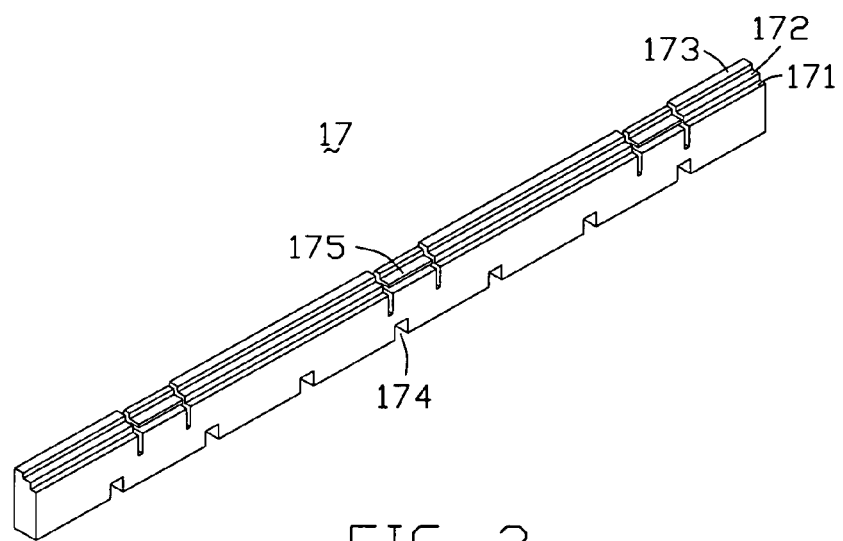
FIG. 2 is an isometric, enlarged view of the side bar of FIG. 1.

Referring also to FIG. 2, the side bar 17 is substantially linear. The side bar 17 includes a plurality of step assemblies (not labeled) at a first portion thereof, and a plurality of notches 174 defined in the other sides thereof. Each step assembly includes a first step 171, a second step 172, and a third step 173 arranged in that order from bottom to top. The first steps 171 are configured to support the optical film assembly 14. The second steps 172 are configured to support the liquid crystal panel 12. The third steps 173 are configured to locate the liquid crystal panel 12. The notches 174 respectively correspond to the light tubes 15, and are configured to receive and limit ends (not labeled) of the light tubes 15.

The side bar 17 further includes a plurality of elastic members 175 located at the first portion thereof. Each elastic member 175 has a two-step structure. A first surface (not labeled) of the elastic member 175 is substantially coplanar with the third step 173, and a lower surface (not labeled) between the first surface and a bottommost surface (not labeled) of the elastic member 175 is substantially coplanar with the second step 175. A receiving groove 176 is defined between the bottommost surface of the elastic member 175 and the first step 171. The receiving groove 176 is configured to receive an edge portion of the optical film assembly 14, and has a height slightly less than a thickness of the optical film assembly 14.

Figure 3:
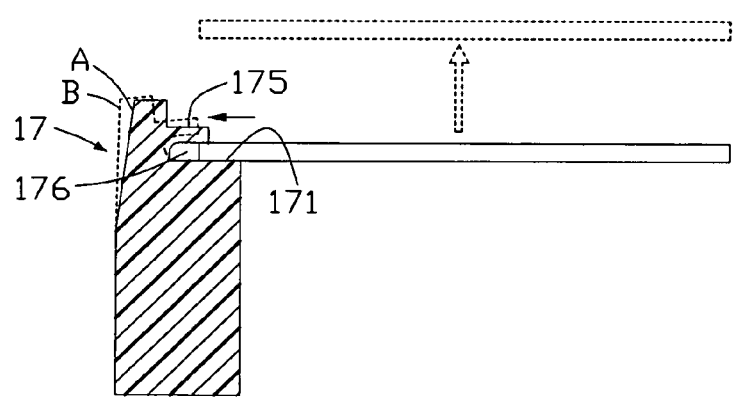
FIG. 3 is a cross-section of detachment of the optical film assembly from the side bar.
Figure 4:
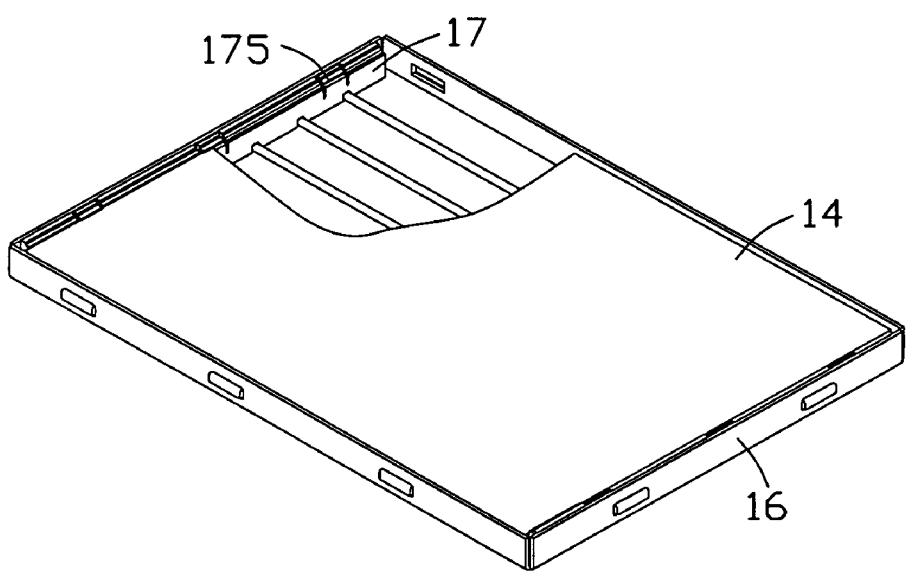
FIG. 4 is an assembled view of part of the liquid crystal display of FIG. 1.
Figure 5:
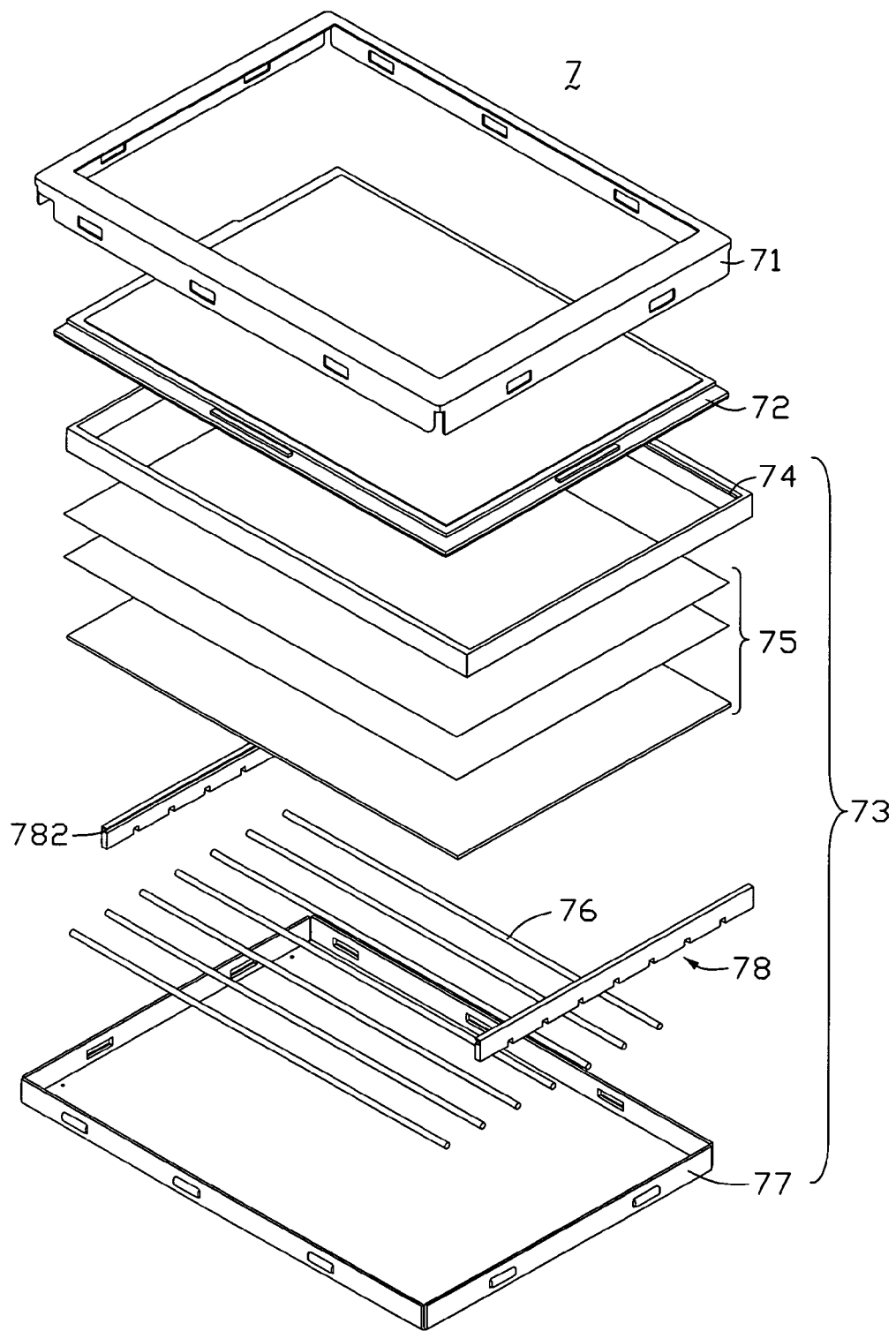
FIG. 5 is an exploded, isometric view of a conventional liquid crystal display.
Figure 6:
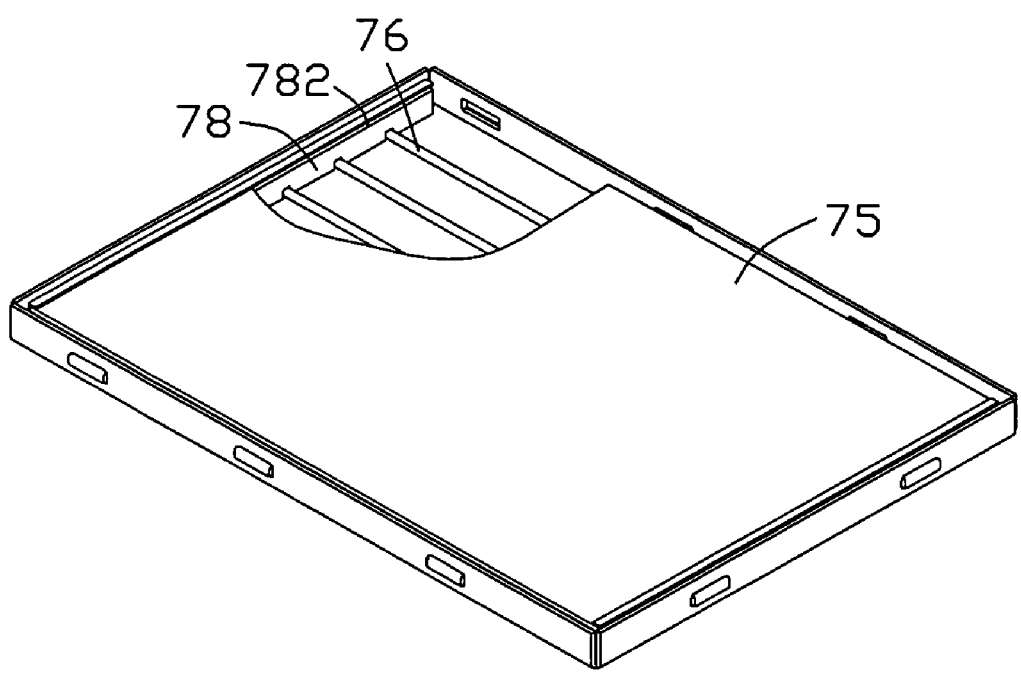
FIG. 6 is assembled view of part of the liquid crystal display of FIG. 5.

Referring also to FIG. 3 and FIG. 4, a first portion (not labeled) of the elastic member 175 moves from a position A to a position B when external force is applied to the elastic member 175 during assembly of the optical film assembly 14 to the side bar 17, and the height of the receiving groove 176 is correspondingly increased. Thus, the edge portion of the optical film assembly 14 can be inserted in the receiving groove 176. When external force is released, the first portion of the elastic member 175 returns from position B to position A. Thus, the height of the receiving groove 176 is resumed, and the edge portion of the optical film assembly 14 is secured by the lower surface of the elastic member 175.

In summary, the height of the receiving groove 176 of the side bar 17 can be elastically changed during assembly of the optical film assembly 14 to the side bar 17 or detachment of the optical film assembly 14 therefrom. That is, the edge of the optical film assembly 14 can be elastically secured by the elastic member 175 and reliably detached from the side bars 17 without any concern for damage to the optical film assembly 14. Thus, the backlight module 13 can be conveniently assembled or detached, and the liquid crystal display 1 employing the backlight module 13 can correspondingly be conveniently assembled or detached due to the above-described details.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a back plate;
    a side bar received in the back plate, the side bar comprising:
        a main body comprising a plurality of step assemblies at a first portion thereof, each step assembly comprising a lower step, a middle step, and a higher step arranged in that order; and
        an elastic member extending from the main body, the elastic member comprising a first surface, a bottommost surface and a lower surface between the first surface and the bottommost surface, wherein the first surface is substantially coplanar with the higher step, the lower surface is substantially coplanar with the middle step, and a receiving groove is defined between the bottommost surface and the lower step; and
    an optical film assembly received in the back plate, the optical film assembly comprising an edge portion elastically received in the receiving groove, with the lower step supporting the optical film assembly.

2. The backlight module of claim 1, wherein a height of the receiving groove is less than a thickness of the optical film assembly when the elastic member is in a relaxed state.

3. The backlight module of claim 2, wherein a height of the receiving groove exceeds the thickness of the optical film assembly when the elastic member is elastically deformed.

4. A liquid crystal display comprising:
    a liquid crystal panel; and
    a backlight module configured to illuminate the liquid crystal panel, the backlight module comprising:
        a back plate;
        a side bar received in the back plate, the side bar comprising:
            a main body comprising a plurality of step assemblies at a first portion thereof, each step assembly comprising a lower step, a middle step, and a higher step arranged in that order; and
            an elastic member extending from the main body, the elastic member comprising a lower surface and a bottommost surface arranged in that order, wherein the lower surface is substantially coplanar with the middle step, and a receiving groove is defined between the bottommost surface and the lower step; and
        an optical film assembly received in the back plate, and comprising an edge portion elastically received in the receiving groove.

5. The liquid crystal display of claim 4, wherein the lower step is configured to support the optical film assembly.

6. The liquid crystal display of claim 5, wherein the elastic member further comprises a first surface substantially coplanar with the higher step, and the lower surface is between the first surface and the bottommost surface.

7. The liquid crystal display of claim 6, wherein a height of the receiving groove is less than a thickness of the optical film assembly when the elastic member is in a relaxed state.

8. The liquid crystal display of claim 7, wherein a height of the receiving groove exceeds the thickness of the optical film assembly when the elastic member is elastically deformed.

9. A backlight module comprising:
    a back plate;
    a side bar received in the back plate, the side bar comprising:
        a main body, the main body comprising a plurality of step assemblies at a top portion thereof, each step assembly comprising a lower step, a middle step, and a higher step arranged in that order; and
        at least one elastic member extending from the top portion of the main body, the at least one elastic member comprising a top surface, a lower surface and a bottommost surface; and
    an optical film assembly received in the back plate, the optical film assembly comprising an edge portion;

wherein the lower surface is substantially coplanar with the middle step, and a receiving groove is defined between the bottommost surface and the lower step, and the edge portion of the optical film assembly is received in the receiving groove.

10. The backlight module of claim 9, wherein the main body further comprises a plurality of notches at a bottom portion thereof.

11. The backlight module of claim 10, further comprising a plurality of light tubes, wherein the plurality of notches respectively corresponds to the plurality of light tubes to respectively receive and limit ends of the plurality of light tubes.

12. The backlight module of claim 9, wherein the lower step is configured to support the optical film assembly.

13. The backlight module of claim 12, wherein the at least one elastic member further comprises a top surface substantially coplanar with the higher step, and the lower surface is between the top surface and the bottommost surface.

14. The backlight module of claim 13, wherein a height of the receiving groove is less than a thickness of the optical film assembly when the at least one elastic member is in a relaxed state.

15. The backlight module of claim 13, wherein a height of the receiving groove exceeds the thickness of the optical film assembly when the at least one elastic member is elastically deformed.

* * * * *